United States Patent [19]
Jarrett

[11] Patent Number: 5,004,183
[45] Date of Patent: Apr. 2, 1991

[54] SWITCHED COMPARATOR SYSTEM FOR OBTAINING DYNAMIC RANGE

[75] Inventor: Bobby R. Jarrett, Fredericksburg, Va.

[73] Assignee: The United States of America as represented by the Secretary of the Navy, Washington, D.C.

[21] Appl. No.: 579,190

[22] Filed: May 23, 1975

[51] Int. Cl.⁵ ............................................. F41G 7/00
[52] U.S. Cl. ................................. 244/3.11; 250/208.3
[58] Field of Search .................... 244/3.11; 340/172.5; 356/141, 4, 5; 250/203 R, 200, 202, 208–210, 215; 356/4, 5, 141; 341/138, 141

[56] References Cited
U.S. PATENT DOCUMENTS
3,657,547 4/1972 Mansfield ........................ 250/203 R

*Primary Examiner*—Brian S. Steinberger
*Attorney, Agent, or Firm*—John D. Lewis; Kenneth E. Walden

[57] ABSTRACT

In guidance systems such as bang-bang missiles or laser guided bombs, the necessary dynamic range is gained by switching between arrays of comparators as a function of signal strength.

12 Claims, 2 Drawing Sheets

FIGURE I PRIOR ART

SWITCHED COMPARATOR SYSTEM FOR OBTAINING DYNAMIC RANGE

BACKGROUND

In most missile guidance systems, there is a requirement for considerable dynamic range. This is due to the fact that the target signal strength is a function of the inverse square of the distance separating the missile and target. The usual limitation on linear processing of this signal is the biasing voltages of the processing circuits. The required compression is usually gained through the use of logarithmic amplifiers which can have a dynamic range of 100 dB. These amplifiers can be quite expensive, especially if they must be of the video type. Also, in certain low-noise applications, log amplifiers can be major contributors to the processing circuit noise. They require high quality precision components and can be rather difficult to temperature compensate. These log amplifiers, for the most part, do not readily lend themselves to implementation in the monolithic technology.

Fast rise-time logarithmic video amplifiers use a summation approach to approximate the logarithmic function. As such, they are really pseudo-logarithmic amplifiers. They are generally implemented by a multi-stage-parallel-summation technique. Each stage of a generalized logarithmic amplifier consists of a linear amplifier, an attenuator, and a logarithmic amplifier that has logarithmic characteristics over a limited span of the total dynamic range. The linear amplifiers and attenuators are selected to phase in each logarithmic stage sequentially as a function of input intensity. The stages generally provide from 15 to 20 dB dynamic range each.

SUMMARY OF THE INVENTION

In a laser guided system, for example, a four quadrant detector receives laser energy. The energy falling on one sector generates an output corresponding to the energy incident on that sector. The quadrant outputs are passed to a mixer bridge network where a monopulse summing operation of adjacent quadrant pairs is performed. The signals are processed by comparators to determine the directions for correction. The required dynamic range is gained by switching between arrays of comparators. The dynamic range available is a function of the resolution and the input range of the comparators.

Two NAND gates per channel are used to multiplex either the high level bank of comparators or the low level bank. If the low level threshold is met and the high level threshold is not, then the low level comparator output signals will be passed along to the guidance fin command system so that a flight correction can be made. Conversely, if the high level threshold is met, the low level comparator output signals will be inhibited from passing to the guidance fin command system while the high level comparator outputs will be sent.

STATEMENT OF THE OBJECTS OF INVENTION

An object of this invention is to provide a low noise, economical, high speed scheme for obtaining dynamic range.

Other objects, advantages and novel features of the invention will become apparent from the following detailed description of the invention when considered in conjunction with the accompanying drawings.

DETAILED DESCRIPTION OF THE INVENTION

Figure 1:
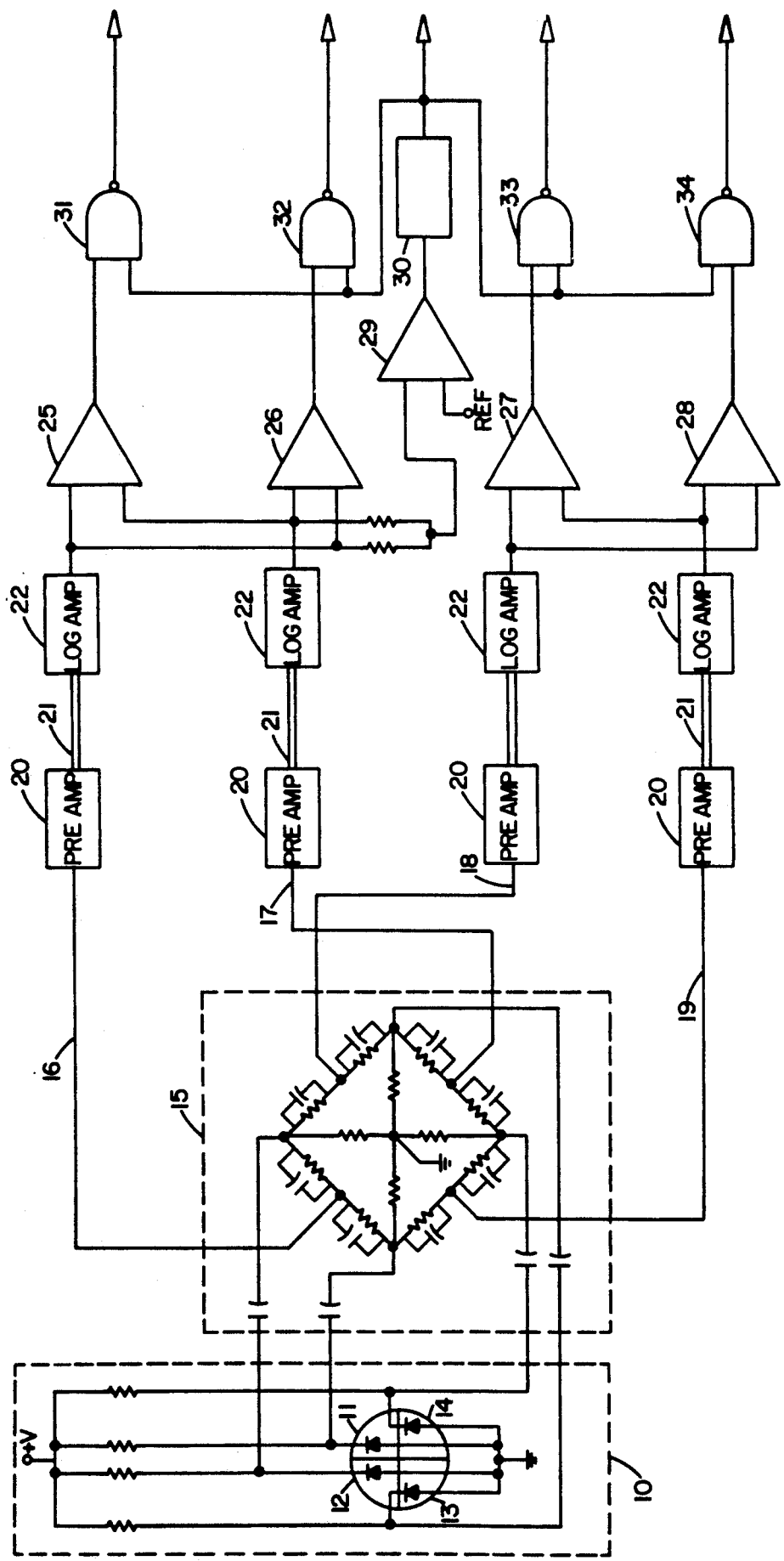
FIG. 1 is a prior art block diagram of the analog portion of a laser guided bomb.

A block diagram of the analog portion of the laser guided bomb kit built by Texas Instruments, Inc. is shown in FIG. 1.

The detector 10 contains optics and electronic circuitry for generation of directional error signals when the flight path of the weapon does not terminate at the target (i.e., does not align with a direct line to the target). The detector, for example, senses laser energy reflected from the target, and generates one or more directional error signals when the point of maximum intensity of sensed reflected energy does not correspond with the optical center of the detecting element. The detector is gimbal mounted, and aligns with the velocity vector of the weapon regardless of weapon orientation or attitude.

The directional error signals from the detector are converted into guidance fin command signals to initiate movement of the appropriate guidance-fin pair in the proper direction. Other circuitry determines whether the strength of the laser energy being sensed by the detector is of sufficient intensity and has the proper frequency and pulse rate characteristics. If the strength of the received laser energy is below a minimum value (or if the detector has not acquired or has lost the target), if the received energy does not have the required characteristics, or if the weapon is on the correct flight path, then no guidance-fin command signals are generated, the guidance fins assume a neutral position, and the weapon follows a ballistic flight path until a flight path correction is needed.

The four quadrant detector 10 of FIG. 1 receives laser energy through an optical filter and a focusing lens. Energy falling on one sector generates an output corresponding to the energy incident on that sector. The quadrant outputs of the detector are passed to a mixer bridge network 15 where a monopulse summing operation of adjacent quadrant pairs is performed. That is, an input to the detector 10, striking only one quadrant, will generate two signals at the output of the mixer network representing pitch and yaw commands. For example, quadrants 11 and 12 are summed to indicate UP 16; quadrants 13 and 14 indicate DOWN 17; quadrants 12 and 13 indicate LEFT 18; and, quadrants 11 and 14 indicate RIGHT 19. The bridge 15 also serves to attenuate the signal, increase the rise time, and stretch the pulse width. The pre-amps 20 provide a high impedance load for the bridge outputs 16,17,18 and 19 and serve to back terminate the coax lines 21 that carry the signal back to the computer stack containing the log amps 22. Note that, in order to maintain dynamic range, very little amplification is provided by the pre-amps (less than two).

The log amplifiers 22 have a required operating range of approximately 87 dB or 22,500 ratio. The input signals are compressed into a voltage range of 0.2 to 3.0 volts, or 15 to 1 ratio. Weak input signals are amplified and strong ones are attenuated.

The comparators 25, 26, 27 and 28 have the function of comparing pairs of outputs from the log amps (UP- DOWN and LEFT-RIGHT) and making decisions as to the directions for correction. A reference voltage (not shown) is established at the input of comparators 25, 26,27 and 28. This provides the first threshold for individual channels. There is also a total signal strength threshold established by comparator 29, where the UP and DOWN signals (representing the total detector output) are summed at the negative input. If the summed signal pulse is large enough to overcome the reference or threshold value, the output will switch, initiating the master trigger seventh-nanosecond one-shot 30. This output is used to strobe the NAND gates 31,32,33 and 34 following the channel comparators. The analog outputs of the log amp have now been converted to digital signals to indicate the condition of the target, whether it is UP, DOWN, LEFT or RIGHT.

Figure 2:
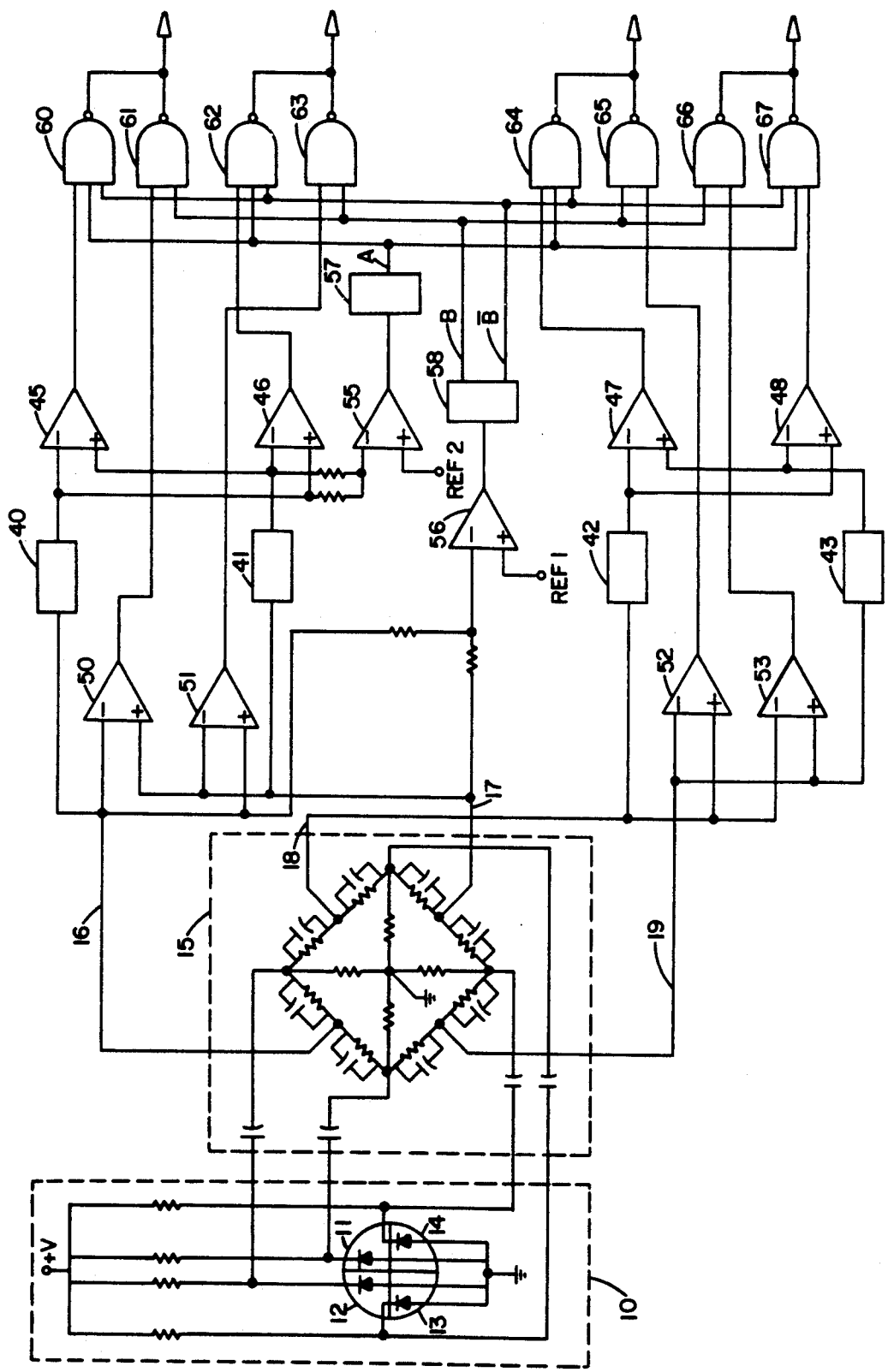
FIG. 2 is a block diagram of the switched comparator scheme.

In the switched comparator scheme, FIG. 2, the required dynamic range is gained by switching between arrays of comparators. The dynamic range available is a function of the resolution (in millivolts) and the input range (in volts) of the comparators. Using a comparator, for example, with a reference of 10 millivolts and an input range accommodating 10 volt negative swing would provide a ratio of 1000. Using two would provide a ratio of 1,000,000 or 100 dB.

At threshold, the mixer bridge output 16,17,18,19 at maximum range would be somewhere in the neighborhood of 100-300 microvolts for the laser guided bomb being considered. With a minimum range bridge output, for example, of 100 microvolts, maximum output of 10 volts, and gain of 1000 amplifiers 40,41,42 and 43, the low level bank of comparators 45,46,47,48 and 55 and the high level bank of comparators 50,51,52,53 and 56, would operate over the same voltage range. Target strength detectors 55 and 56 are used to produce initiation of the strobe one-shot multi vibrators 57 and 58. Two NAND gates per channel (gates 60 and 61 for the UP channel, gates 62 and 63 for DOWN, gates 64 and 65 for LEFT, and gates 66 and 67 for RIGHT) are used to multiplex either the low-level or high level portion. If the low level threshold (comparator 55) is met and the high level threshold (comparator 56) is not, then the outputs A and $\overline{B}$ of the one-shots 57 and 58, will both be true, permitting the output of comparators 45,46,47 and 48 to be passed through the NAND gates 60,62,64 and 67. Conversely, if output B is true, the one-shot multi vibrator output $\overline{B}$ will inhibit NAND gates 60,62,64 and 67, while NAND gates 61, 63, 65 and 66 will pass the high level comparator outputs along to the guidance fin command system.

Obviously many modifications and variations of the present invention are possible in the light of the above teachings. It is therefore to be understood that within the scope of the appended claims the invention may be practiced otherwise than as specifically described.

What is claimed is:

1. A switched comparator device for obtaining dynamic range in a bang-bang system comprising:
    means for monopulse summing of an input signal and having outputs representative of the sums;
    a low level bank of comparators operatively connected to the outputs of said summing means;
    a high level bank of comparators operatively connected to the outputs of said summing means; and
    means to electrically multiplex either said high level or low level bank of comparators.

2. The device of claim 1 wherein said means for monopulse summing comprises:
    a four quadrant detector; and
    a mixer bridge connected to said detector to combine said adjacent quadrants signals.

3. The device of claim 1 wherein said low level bank of comparators comprises:
    a plurality of linear amplifiers wherein the input of each amplifier is an output of said summing means;
    a plurality of comparators wherein the inputs of each comparator is a pair of outputs of said linear amplifiers and wherein the output of each comparator is operatively connected to said multiplex means; and
    a thresholding device for total signal strength determination wherein the output is used to strobe said multiplex means.

4. The device of claim 3 wherein said thresholding device comprises:
    a target strength detector wherein one input is a reference voltage and the other input is the total summed signal strength of said summing means; and
    a one-shot wherein the input is the output of said target strength detector and wherein the output is connected to said multiplex means.

5. The device of claim 1 wherein said high level bank of comparators comprises:
    a plurality of comparators wherein the inputs of each comparator is a pair of outputs of said summing means and wherein the output of each comparator is operatively connected to said multiplex means; and
    a thresholding device for total signal strength determination wherein the output is used to strobe said multiplex means.

6. A device of claim 5 wherein said thresholding device comprises:
    a comparator wherein one input is a reference voltage and the other input is the total summed signal strength of said summing means; and
    a one-shot multi vibrator wherein the input is the output of said comparator and wherein the output is connected to said multiplex means.

7. A device of claim 1 wherein said multiplex means comprises:
    a plurality of pairs of NAND gates wherein the outputs of each pair is wire ORed and wherein the inputs of each pair are operatively connected to the outputs of said low level bank and to the outputs of said high level bank.

8. A device of claim 2 wherein said low level bank of comparators comprises:
    four linear amplifiers wherein the input of each amplifier is an output of said mixer bridge
    four comparators wherein the inputs of each comparator is a pair of outputs of said linear amplifiers and wherein the output of each comparator is operatively connected to said multiplex means; and
    a thresholding device for total signal strength determination wherein the output is used to strobe said multiplex means.

9. A device of claim 8 wherein said thresholding device comprises:
    a comparator wherein the one input is a reference voltage and the other input is the total summed signal strength of said detector; and
    a one-shot wherein the input is the output of said comparator and wherein the logic true output is connected to said multiplex means.

10. A device of claim 9 wherein said high level bank of comparators comprises:

four comparators wherein the inputs of each comparator is a pair of outputs of said mixer bridge and wherein the output of each comparator is operatively connected to said multiplex means; and a thresholding device for total signal strength determination wherein the output is used to strobe said multiplex means.

11. A device of claim 10 wherein said thresholding device comprises:

a comparator wherein one input is a reference voltage and the other input is the total signal strength of said detector; and a one-shot wherein the input is the output of said comparator and wherein the outputs are connected to said multiplex means.

12. A device of claim 11 wherein said multiplex means comprises:

four pairs of NAND gates wherein the outputs of each pair are wire-ORed and wherein the inputs of each pair are operatively connected to the outputs of said low level bank and to the outputs of said high level bank.

* * * * *